United States Patent [19]

Ohmi

[11] Patent Number: 4,472,997
[45] Date of Patent: Sep. 25, 1984

[54] BRAKE POWER MULTIPLYING DEVICE FOR AUTOMOBILE BRAKE SYSTEM

[75] Inventor: Atsushi Ohmi, Anjyo, Japan

[73] Assignee: Aisin Seiki Kabushiki Kaisha, Kariya City, Japan

[21] Appl. No.: 353,519

[22] Filed: Mar. 1, 1982

[30] Foreign Application Priority Data

Mar. 30, 1981 [JP] Japan .................. 56-45055[U]

[51] Int. Cl.³ .............................................. F15B 9/10
[52] U.S. Cl. ................................ 91/376 R; 91/369 A
[58] Field of Search ............ 91/369 A, 369 B, 369 R, 91/376 R

[56] References Cited

U.S. PATENT DOCUMENTS 3,688,647  9/1972  Kyatta.

FOREIGN PATENT DOCUMENTS 2064690  6/1981  United Kingdom.
2065809  7/1981  United Kingdom ............ 91/369 A Primary Examiner—Paul E. Maslousky
Attorney, Agent, or Firm—Finnegan, Henderson, Farabow, Garrett & Dunner

[57] ABSTRACT

Brake power multiplying devices for automobile brake systems include a housing having a pressure responsive flexible diaphragm for dividing the inside chamber of the housing into a suction pressure chamber and a counter-pressure chamber. A piston made of a plastic material is attached to the diaphragm and houses an air valve and a control valve which are adapted to be actuated by a push rod operated by a driver of the automobile through a brake pedal or like operating member. A key member made of a metallic material is provided for holding the air valve on the piston. The key member includes a pair of outer holding arms having tip ends attached with rubber members so that it does not damage the plastic piston.

5 Claims, 4 Drawing Figures

BRAKE POWER MULTIPLYING DEVICE FOR AUTOMOBILE BRAKE SYSTEM

The present invention relates to a brake power multiplying device for automobile brake systems and more particularly to a key mechanism for such brake power multiplying device.

Conventionally, brake power multiplying devices for automobile brake systems include a housing having a pressure responsive flexible diaphragm for dividing the inside chamber of the housing into a suction pressure chamber and a counter-pressure chamber. A piston is attached to the diaphragm and houses an air valve and a control valve which are adapted to be actuated by a push rod operated by a driver of the automobile through a brake petal or like operating member. The control valve is provided between the suction pressure chamber and the counter-pressure chamber and is normally opened so that the pressures in the chambers are balanced and the diaphragm is maintained under the action of a return spring in a brake release position. The air valve is normally closed so that the counter-pressure chamber is separated from the atmosphere. When the push rod is actuated the control valve is closed to disconnect the counter-pressure chamber from the suction pressure chamber and the air valve is opened to introduce the atmospheric pressure into the counter-pressure chamber. Thus, the diaphragm is displaced under the pressure difference between the suction pressure chamber and the counter-pressure chamber against the action of the return spring.

In the conventional structures, in order to hold the air valve in the piston, there is provided a key member which has inner arm portions loosely holding the air valve and outer arm portions loosely holding the outer periphery of the piston. The piston is usually made of a plastic material whereas the key member is made of a metallic material so that there is a possibility that the piston is damaged by the key member during operation.

The present invention has therefore an object to provide a key mechanism for a brake power multiplying device in which the key member does not damage the piston.

Another object of the present invention is to provide a key mechanism which functions not only to hold the air valve in the piston but also to maintain the attitude of the piston in the brake release position.

A further object of the present invention is to provide a key mechanism for holding the air valve in the piston in which problems of seizure of the key member can be prevented.

According to the present invention, the above and other objects can be accomplished by a brake power multiplying device which comprises housing means having an inside cavity, diaphragm means provided in said housing means to divide said inside cavity of the housing means into a suction pressure chamber and a counter pressure chamber, means for connecting said suction pressure chamber with a suction pressure source, piston means carried on said housing means for axial movement with respect thereto and connected with said diaphragm means, passage means formed in said piston means for connecting said suction pressure chamber with said counter-pressure chamber, normally open control valve means provided in said passage means on said piston means, normally closed air valve means provided on said piston means for opening upon actuation said counter-pressure chamber to atmosphere, push rod means for actuating said control valve means and said air valve means to close said control valve means so that the counter-pressure chamber is separated from the suction pressure chamber and to open said counter-pressure chamber to atmosphere through said air valve means, output means provided on said diaphragm means, key means for holding said air valve means on said piston means, said key means including a key member having first bifurcated arm means loosely holding said air valve means and second bifurcated arm means for loosely holding said piston means, said second arm means having tip end portions attached with holding members of a resilient material which are adapted for a holding engagement with said piston means, said key member having cushioning means adapted for engagement with said housing means in a brake release position.

According to the features of the present invention, since the second bifurcated arm means is provided with holding members of a resilient material, it is possible to prevent any damage of the piston which may otherwise be caused when the piston is made of a plastic material. The holding members may be formed so that they are engaged with said housing means in the brake release position so that they can function to maintain the attitude of the piston means together with the cushioning means.

The above and other objects and features of the present invention will become apparent from the following descriptions of preferred embodiments taking reference to the accompanying drawings, in which.

Figure 1:
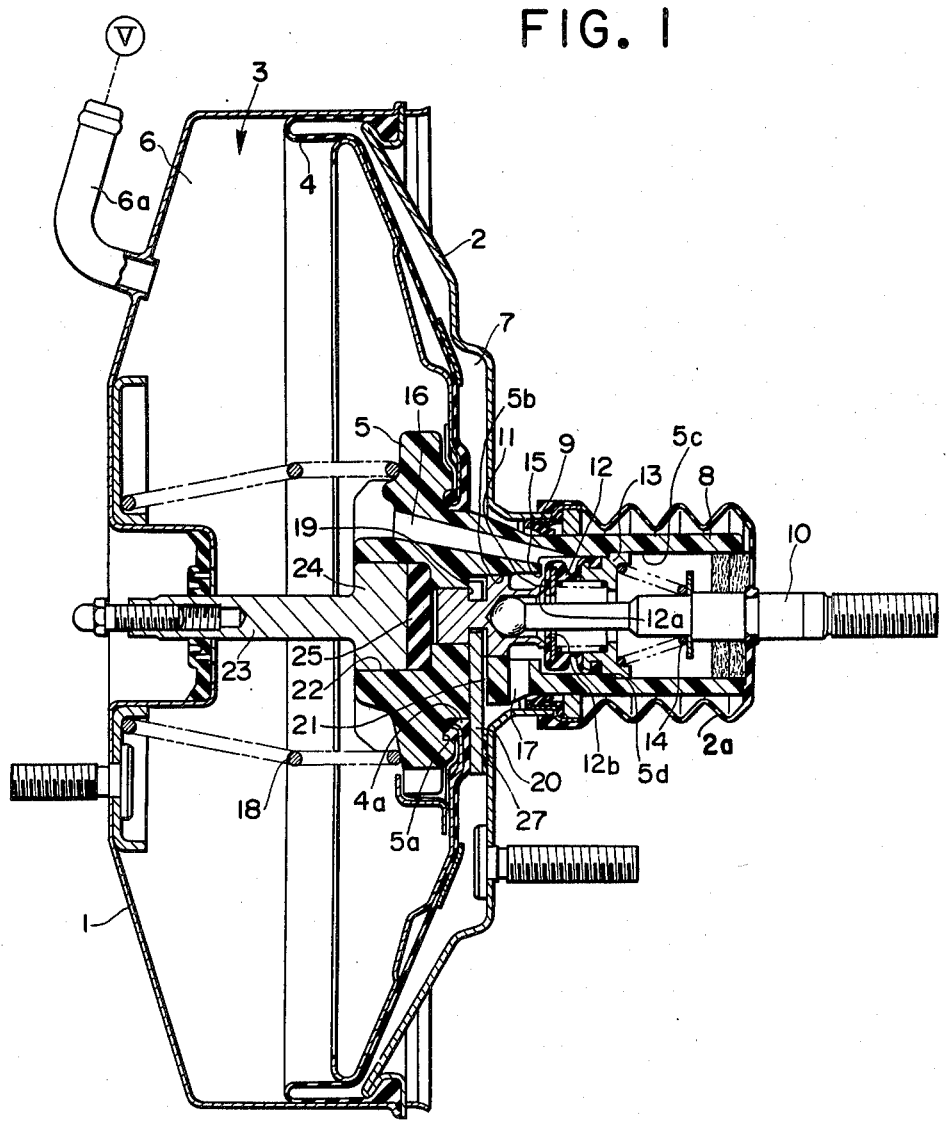
FIG. 1 is a sectional view of a brake force multiplying device in accordance with one embodiment of the present invention.

Referring now to the drawings, particularly to FIG. 1, there is shown a brake power multiplying device which comprises a housing constituted by a pair of housing shells 1 and 2 which are mated together at the circumferential peripheries to define a cavity 3 therein. In the housing, there is disposed a flexible diaphragm 4 which is held airtightly at the outer periphery thereof between the peripheries of the housing shells 1 and 2. The diaphragm 4 has an inner periphery which is secured to a piston 5. For the purpose, the piston 5 is formed with an annular groove 5a and the diaphragm 4 has an annular bead 4a at the inner periphery thereof for fitting engagement with the annular groove 5a. The diaphragm 4 and the piston 5 divide the cavity 3 in the housing into a suction pressure chamber 6 and a counter pressure chamber 7.

The piston 5 has a cylindrical axial extension 8 which outwardly extends through the housing shell 2 for axial sliding movement with respect thereto. An annular seal 9 is provided between the housing shell 2 and the cylindrical extension 8 of the piston 5. A collapsible shield 2a provided for covering the cylindrical extension 8 of the piston 5 to thereby protect it from dust.

In the piston 5, there are disposed an air valve 11 and a control valve 12. A push rod 10, which is adapted to be actuated manually by means of a brake actuating member such as a brake pedal extends through the piston 5 and has an inner end of a spherical configuration engaged with the air valve 11. For receiving the air valve 11 and the control valve 12, the piston 5 is formed with a small diameter bore 5b and a large diameter bore 5c with an annular valve seat 15 formed between the bores 5b and 5c. The air valve 11 is located in the bore 5b for axial sliding movement for a limited distance. The control valve 12 is attached to a retaining disc 13 which is axially slidably received in the bore 5c. The control valve 12 has a planar valve surface 12a having a central aperture 12b through which the push rod 10 extends. The valve surface 12a of the control valve 12 is adapted for engagement with the valve seat 15 in the piston 5 and the rightward end of the air valve 11.

The piston 5 is formed with a passage 16 which opens at one end to the suction pressure chamber 6 and at the other end to the large diameter bore 5c of the piston 5. The piston is further formed with a radial hole 17 which connects the counter pressure chamber 7 with the small diameter bore 5b. It will therefore be understood that, when the control valve 12 is disengaged from the valve seat 15, the suction pressure chamber 6 is connected through the passages 16 and 17 with the counter pressure chamber 7. Further, when the air valve 11 is engaged with the valve surface 12a, the counter pressure chamber 7 is disconnected from the atmosphere, however, when the air valve 11 is disengaged from the valve surface 12a, the chamber 7 is opened to the atmosphere through the aperture 12b in the control valve 12. A spring 14 is provided in the large diameter bore 5c to act between the valve retaining disc 13 and the push rod 10 to bias the disc 13 and therefore the control valve 12 toward left. In order to limit the leftward movement of the control valve 12, the large diameter bore 5c has a stepped portion 5d to which the valve retaining disc 13 engages upon its leftward movement.

In the suction pressure chamber 6, there is provided a return spring 18 which forces the piston 5 toward right as seen in the plane of FIG. 1. An output member 23 is fitted at its right end portion 24 to a counter bore 22 of the piston 5 through an appropriate cushion member 24 and extends outwardly through the housing shell 1. The suction pressure chamber 6 is connected through a conduit 6a with a suction pressure source V.

Figure 2:
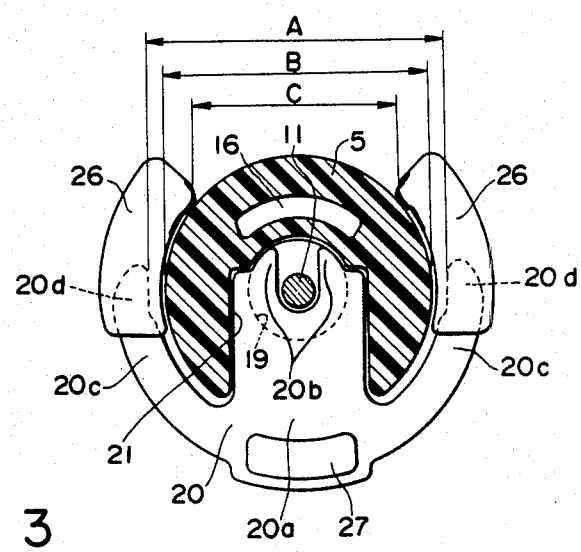
FIG. 2 is a cross-sectional view of the piston assembly particularly showing the configuration of the key member.
Figure 4:
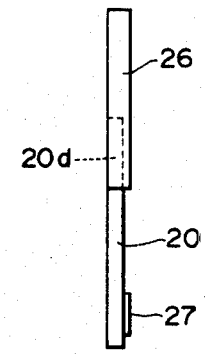

In order to hold the air valve 11 in the piston 5, there is provided a key member 20. As shown in FIG. 2, the key member 20 has a central leg 20a formed at its tip end with a pair of arms 20b. The piston 5 is formed with a slit 21 which loosely receives the leg 20a. The air valve 11 is formed at the outer surface with an annular groove 19 which receives the arms 20b with a certain axial clearance. The key member 20 is further formed with a pair of outer arms 20c which extend upwardly around the piston 5. The arms 20c have end portions 20d terminating slightly above the center of the piston 5. The arms 20c are attached to rubber members 26 which extend upwardly and are adapted to embrace the piston 5 so as to prevent the key member 20 from dropping off. As shown in FIG. 2, the end portions 20d are spaced apart from each other by a distance A which is greater than the outer diameter B of the piston 5. However, the space C between the tip ends of the rubber members 26 is smaller than the diameter B of the piston 5 so that the key member 20 is firmly maintained on the piston 5. Since the rubber members 26 are flexible, the key member 20 can be mounted on the piston 5 by deflecting the rubber members 26. As shown in FIGS. 2 and 4, the key member 20 is further provided at a side facing to the housing shell 2 with a rubber cushion 27 which is adapted for engagement with the inner surface of the housing shell 2 when the piston 5 is displaced under the action of the spring 18 rightwards in the plane of FIG. 1.

Figure 3:
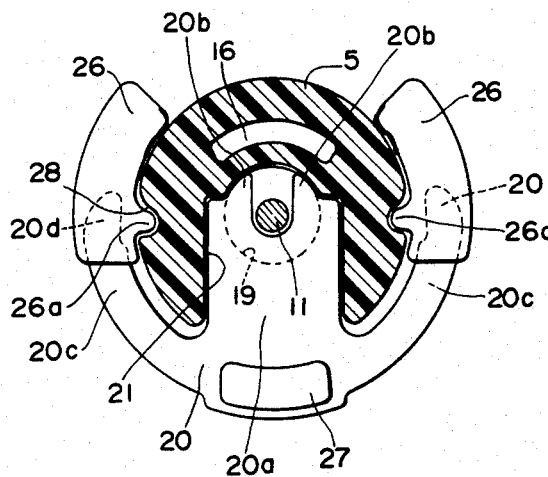
FIG. 3 is a sectional view similar to FIG. 2 but showing another embodiment; and, FIG. 4 is a side elevational view of the key member.

Referring to FIG. 3 which shows another embodiment, it will be noted that the structure shown therein is substantially the same as that shown in FIG. 2 so that corresponding parts are shown by the same reference characters as in FIG. 2. In the embodiment shown in FIG 3, the rubber members 26 are formed at the inner side surfaces with inward projections 26a which are adapted to be engaged removably with corresponding recesses 28 formed in the piston 5.

In the brake release position, the push rod 10 is released. The push rod 10 is therefore retracted toward right and the air valve 11 is pushed against the valve surface 12a of the control valve 12 to disconnect the counter pressure chamber 7 from the atmosphere. The control valve 12 is displaced toward right and there is a slight clearance between the valve surface 12a and the valve seat 15 so that the suction pressure chamber 6 is connected with the counter pressure chamber 7 through the passages 16 and 17. Therefore, the diaphragm 4 and the piston 5 are displaced under the action of the return spring 18 toward right as shown in FIG. 1. In this position, the rubber members 26 and the rubber cushion 27 on the key member 20 are in abutting engagement with the inner surface of the housing shell 2. Since the key member 20 is thus held against the inner surface of the housing shell 2 at the three portions, it is possible to maintain the attitude of the key member 20 and therefore the attitude of the piston 5 in the brake release position.

When the push rod 10 is actuated toward the left, the control valve 12 is engaged at the valve surface 12a with the valve seat to thereby disconnect the counter pressure chamber 7 from the suction pressure chamber 6. The air valve 11 is then displaced further toward left so that the valve 11 is disengaged from the valve surface 12a. Thus, the counter pressure chamber 7 is opened to the atmosphere through the passage 17 and the aperture 12b in the control valve 12. The diaphragm 4 and the piston is therefore displaced under the pressure difference between the chambers 6 and 7 toward left against the action of the return spring 18. The movement of the piston 5 is then transmitted through the output member 23 to a brake master cylinder (not shown). When the force on the push rod 10 is released, the diaphragm 4 and the piston 5 are returned under the action of the spring 18 as described previously.

In the structure described above, the piston 5 may be made of a plastic material and the key member 20 is usually made of a metallic material. However, since the key member 20 is provided at the outer arms 20c with rubber members 26, it is possible to prevent the piston 5 from being damaged by the key member 20. Further, the rubber members 26 on the outer arms 20c of the key member 20 are effective to maintain the attitude of the piston in the brake release position in cooperation with a rubber cushion member 27 which may optionally be provided on the key member 20.

The invention has thus been shown and described with reference to specific embodiments, however, it should be noted that the invention is in no way limited to the details of the illustrated structures but changes and modifications may be made without departing from the scope of the appended claims.

I claim:

1. A brake power multiplying device which comprises housing means having an inside cavity, diaphragm means provided in said housing means to divide said inside cavity of the housing means into a suction pressure chamber and a counter pressure chamber, means for connecting said suction pressure chamber with a suction pressure source, piston means carried on said housing means for axial movement with respect thereto and connected with said diaphragm means, passage means formed in said piston means for connecting said suction pressure chamber means with said counter-pressure chamber means, normally open control valve means provided in said passage means in said piston means, normally closed air valve means provided on said piston means for connecting upon actuation said counter-pressure chamber to atmosphere, push rod means for actuating said control valve means and said air valve means to close said control valve means so that the counter-pressure chamber is separated from the suction pressure chamber and to open said counter-pressure chamber to atmosphere through said air valve means, output means provided on said diaphragm means, key means for holding said air valve means on said piston means, said key means including a key member having first bifurcated arm means loosely holding said air valve means and second bifurcated arm means for loosely holding said piston means, said second arm means having tip end portions attached with holding members of a resilient material which are adapted for holding engagement with said piston means, said key member having cushioning means adapted for engagement with said housing means in a brake release position.

2. A brake power multiplying device in accordance with claim 1 in which said holding members are so shaped that they engage with said housing means together with said cushioning means in the brake release position so as to maintain the attitude of said piston means.

3. A brake power multiplying device in accordance with claim 1 in which said holding members are formed with inward projections and said piston means has recess means adapted for engagement with the inward projections of the holding members.

4. A brake power multiplying device in accordance with claim 1 in which said piston means is made of a plastic material whereas said key member is made of a metallic material.

5. A brake power multiplying device in accordance with claim 4 in which said holding members and said cushioning means are made of rubber material.

* * * * *